United States Patent Office 3,494,717
Patented Feb. 10, 1970

3,494,717
DYEING AND PRINTING PROCESSES
Jacques Wegmann, Bettingen, Hans Heinrich Bosshard, Binningen, Eugen Johann Koller, Oberwil, Basel-Land, and Daniel Porret, Binningen, Switzerland, assignors to Ciba Limited, Basel, Switzerland, a company of Switzerland
No Drawing. Filed Oct. 17, 1966, Ser. No. 586,998
Claims priority, application Switzerland, Oct. 20, 1965, 14,497/65; Sept. 28, 1966, 14,014/66
Int. Cl. D06p 1/36
U.S. Cl. 8—31
14 Claims

ABSTRACT OF THE DISCLOSURE

Process for dyeing fibrous material wherein a water-soluble dyestuff containing an onium group is fixed on said material with an epoxy hydantoin compound by heat treatment.

---

The present invention is based on the observation that materials of fibrous structure, for example, mixed cotton and polyester weaves, can be dyed or printed in fast shades with water-soluble dyestuffs containing onium groups, especially with dyestuffs that contain isothiuronium groups, by applying such dyestuffs to the material and fixing them thereon by a heat treatment, especially by thermofixation or storage in the wet state, with water-soluble polyfunctional epoxy compounds, particularly those containing 2 or 3 epoxy groups or 2 or 3 substituents convertible into such groups, if desired or required in the presence of compounds that contain a C=S group between two amino or imino groups, for example, thiourea.

Fibres that can be colored, i.e., dyed or printed by the present process are, for example, paper, glass fibres, and those consisting of polyesters, cellulose triacetate, polyamides, acrylonitrile and above all regenerated or natural cellulose or mixtures of cellulose with polyesters, and cellulose acetate fibres. The textile material may be in the form of fibres, threads, flocks, or preferably of woven or knitted fabrics.

The water-soluble dyestuffs suitable for use in the present process may belong, for example, to the azo, anthraquinone, vat, acridone, phenazine, dioxazine, diphenylmethane, triphenylmethane, nitro or phthalocyanine series. The onium groups may be ammonium, oxonium, hydrazinium or sulphonium or preferably thiuronium or isothiuronium groups. Dyestuffs that contain readily eliminable onium groups are preferably used.

Dyestuffs of this type have been described, for example, in British specification Nos. 587,636, 613,980, 576,234 and 576,270 and in French specification No. 1,303,367.

Apart from the onium groups the dyestuffs preferably contain no other groups imparting solubility in water, for example, sulphonic or carboxyl groups. They may be prepared according to known methods.

As epoxy compounds suitable for use in the present process there may be mentioned, for example, glycidol, glycerol monoglycidyl ether, butyleneglycol monoglycidyl ether, diglycidyl ether, diglycidylformal and above all triglycidylcyanurate and isocyanurate and the water-soluble compounds of the formulae:

(1) 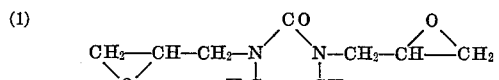

(2) 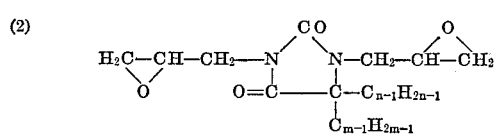

and (3) 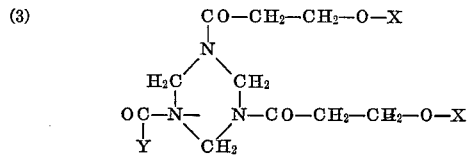

in which $n$ and $m = 1$ or 2, X represents a substituent containing epoxide groups or groups convertible into epoxide groups, and Y represents a group —$CH_2$—$CH_2$—O—X or $CH_2$=CH— or a substituent convertible into one of these groups.

As substituents convertible into epoxide groups there may be mentioned those which contain halohydrin groups of the formula $$\begin{array}{c} H \ \ H \\ -C-C- \\ |\ \ \ | \\ HO\ \ Hal \end{array}$$

As compounds containing a C=S group between two amino or imino groups, which are capable of reacting with the polyepoxides, there may be used thiocarbamates, thiocyanates and above all compounds of the formula (4) 

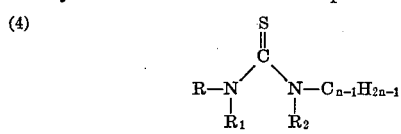

in which $n$ is a whole positive number not exceeding 7, R represents a hydrogen atom or a lower alkyl radical, $R_1$ and $R_2$ each represents an acyl, aralkyl, aryl or alkyl radical or preferably a hydrogen atom or $R_1 + R_2$ represent a continuous aliphatic chain containing 2 or 3 carbon atoms which together with the —NCS residue forms a heterocycle. As examples of such compounds there may be mentioned: N-acetylthiourea, (5) 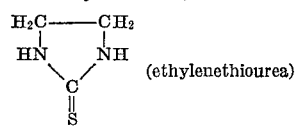

(ethylenethiourea)

N-methylthiourea, N-ethylthiourea, N,N'-dimethylthiourea, N-benzylthiourea, N-phenylthiourea, tetramethylthiourea and preferably the unsubstituted thiourea ($NH_2$—CS—$NH_2$) itself.

According to the simplest way of performing the present process the textile material to be dyed is impregnated with a solution containing both the dyestuff and the epoxy compound and the material thus impregnated is heat-treated to fix the dyestuff. The fixation is carried out by heating or drying at 100° to 300° C., though it is more advantageous to fix the dyestuff in the usual manner by a dry heat-treatment at a temperature within the range from 160° to 240° C., preferably from 190° to 200° C., provided the material to be dyed and/or printed will withstand such temperatures. The duration of the fixing operation may vary within wide limits since it depends on the nature of the dyestuff used, on the epoxy compound used, on possible additives, for example, thiourea, material to be dyed and on the fixing temperature; it is, however, easy to determine the correct temperature by preliminary experiments. It is advantageous to fix the dyestuffs on cellulosic textile material by dry heating at 100° to 200° C. Within this temperature range the fixing of the dyestuff generally takes 1 to 5 minutes to complete. If the fixing operation is performed in the presence of thiourea, it can even be effected by simply storing the wet material at room temperature.

According to a modification of the present process the material to be dyed or printed may first be padded with a dyestuff solution or printed with a printing paste incorporating a water-soluble organic dyestuff containing an onium group, whereupon the printed or impregnated material is dried, if desired or required steamed, then padded with an aqueous solution or an emulsion of an epoxy compound containing 1 to 3 epoxide groups or 1 to 3 substituents convertible into epoxide groups, and finally once more dried.

The padding solution may contain, apart from the aforementioned dyestuffs, various additives, preferably in small quantities, for example compounds that inhibit migration, for example salts or alginates, solution promoters for example alcohols, acids or phosphates, wetting agents for example polyethylene condensation products, hydrotropic substances for example urea, thiourea, formamides, sugars, or catalysts for example zinc silicofluoride, zinc fluoborate, zinc nitrate, magnesium chloride and ammonium nitrate, but it must not contain colourless amines or methylol compounds of amides.

Thus, the present process may be carried out as a one-bath or two-bath process, that is to say the padding solution may contain both the dyestuff solution and the epoxy compound or else the material to be dyed and/or printed may be treated first with the dyestuff and then with the colourless epoxy compound of the kind defined above. In the last-mentioned two-bath process the material to be dyed is preferably treated in a dyebath or with a printing paste containing both the dyestuff and a hydrotropic compound, especially thiourea. The material thus treated is then dried.

The amount of epoxide to be used in the present process may be varied within wide limits. The desired fixation of the dyestuffs can be achieved with 8 to 200 g. per litre. When thiourea is used as well, a smaller proportion of epoxide will suffice; in such a case it is advantageous to use about twice to four times less of the thiourea than of the epoxide.

The dyeings and prints obtainable by the present process are in general distinguished by their excellent wet fastness properties.

Moreover, the dyeings and prints obtained by the present process have not only substantially better fastness properties, for example fastness to chlorine, peroxide, washing and especially boiling soda solutions, but, owing to the almost quantitative fixation of the dyestuffs, the rinsing and soaping treatments can be dispensed with, which is of importance insofar as plant and effluents are concerned. Furthermore, owing to the mildness of the fixing conditions and of the reagents used there is a possibility of using combinations with other types of dyestuffs (for example disperse dyestuffs for mixed weaves of cotton with polyesters). For printing, combinations with pigment dyestuffs are permissible.

The dyeings and prints obtained by the present process have very good wet fastness properties when the water-soluble dyestuffs contain apart from the onium groups no other groups imparting solubility in water, for instance sulphonic or carboxyl groups. When according to the present process these dyestuffs are used on cellulose fibres, there is the further special advantage that the fibre cannot be damaged, even when the dyeings are treated with weak acids at high temperatures (for example from 180 to 240° C.).

Unless otherwise indicated, parts and percentages in the examples are by weight. The relationship between parts by volume and parts by weight is the same as that of the litre measured under standard temperature and pressure to the kilogram.

EXAMPLE 1

20 parts of the dyestuff of the formula (5a)

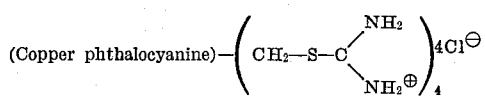

(listed in the Colour Index under the name Ingrain Blue 1) are dissolved in 930 parts of water, and 50 parts of the compound of the formula (6)

$$\text{H}_2\text{C}\underset{\text{O}}{\overset{}{\diagdown}}\text{CH—CH}_2\text{—O—CH}_2\text{—CH}_2\text{—CO—N}\begin{array}{c}\text{CO—CH}_2\text{—CH}_2\text{—O—CH}_2\text{—CH}\underset{\text{O}}{\overset{}{\diagdown}}\text{CH}_2\\ \text{H}_2\text{C}\diagup\diagdown\text{CH}_2\\ \text{N—CO—CH}_2\text{—CH}_2\text{—O—CH}_2\text{—CH}\underset{\text{O}}{\overset{}{\diagdown}}\text{CH}_2\\ \text{CH}_2\end{array}$$

are added. A mercerized cotton fabric is impregnated with this solution, squeezed to a weight increase of 70%, dried for 60 seconds at 180° C., and then heat-set for 30 seconds at 200° C.

The resulting, brilliant blue dyeing displays extreme fastness to washing. The dyestuff is fixed quantitatively so that the dyeing need not be rinsed and soaped.

Similar, good results are obtained with the dyestuffs of the following formulae:

(7)

(8)

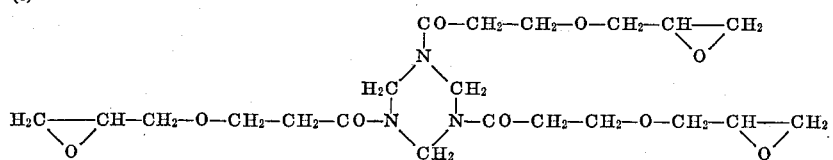

When the epoxy compound mentioned above is replaced by an equal amount of triglycidyl cyanurate, triglycidyl isocyanurate, diglycidyl ether, diglycidylformal, glycidol or butyleneglycol monoglycidyl ether or by an alcoholic solution of butyleneglycol monoglycidyl ether and the procedure is otherwise as described above, similarly good results are obtained.

When the above-mentioned 50 parts of epoxy compound are replaced by a mixture of 20 parts of the epoxy compound and 10 parts of thiourea, or by a mixture of 10 parts of triglycidyl cyanurate and 5 parts of thiourea and the procedure is otherwise as described, similarly good results are obtained.

When the cotton fabric is replaced by a triacetate fabric, a glass fibre fabric or a fabric from polyamide or polyacrylonitrile fibres and the procedure is otherwise as described above, similar good results are also obtained.

EXAMPLE 2

20 parts of the dyestuff first named in Example 1 are dissolved in 780 parts of water, and 100 parts of a 10% aqueous solution of thiourea and triglycidyl cyanurate are added. A spun rayon fabric is impregnated with this solution, squeezed to a weight increase of 80%, rolled up, wrapped in a plastic foil and thus kept for 24 hours. The fabric is then dried on drying cylinders.

A fast blue dyeing is obtained.

EXAMPLE 3

20 parts of the dyestuff first named in Example 1 are dissolved in 10 parts of 80% acetic acid and in 250 parts of water. This solution is mixed with 250 parts of a 20% solution of the diglycidyl imidazolidone of the formula (9)

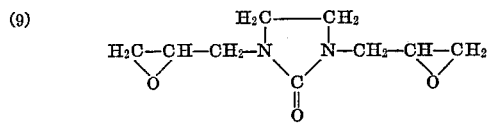

and the whole is stirred into 500 parts of an emulsion thickening. This paste is used for printing a cotton fabric, which is then dried and treated for 2 minutes at 180° C. on a tenter. A fast blue print is obtained.

Preparation of the diglycidyl imidazolidone

A mixture of 215 g. of crude ethyleneurea (88% concentration), 2313 g. of epichlorohydrin and 4 g. of benzyl trimethyl ammonium chloride is brought to the boil at 112° C. The formation of epoxide groups during the reaction is observed by titration after removal of the epichlorohydrin. After 3 hours a resin containing 2.5 gram equivalents of epoxide per kg. has formed. The mixture is cooled to 60° C. and then within 30 minutes 240 g. of 97% sodium hydroxide are added in portions. The flask is occasionally cooled to maintain the temperature at 60° C. After addition of sodium hydroxide the mixture is stirred for another 30 minutes at 60° C. and the reaction product concentrated under 35 mm. Hg pressure until all the water formed has been removed by azeotropic distillation. The salt formed is then filtered and rinsed with a small quantity of epichlorohydrin. The product is then further concentrated, at first under 20 mm. and then under 0.2 mm. Hg pressure, to remove the last traces of volatile constituents, to leave 415 g. of N,N-diglycidyl imidazolidone as a yellow, low-viscous resin which contains 8.5 gram equivalents of epoxide per kg. The product gives a perfectly clear solution in water.

EXAMPLE 4

A glass fibre fabric is impregnated with the dyestuff solution described in Example 2, squeezed to a weight increase of 50%, dried for 60 seconds at 180° C. and then further hardened for 60 seconds at 200° C.

A fast dyeing is obtained.

EXAMPLE 5

20 parts of the dyestuff of the formula (10)

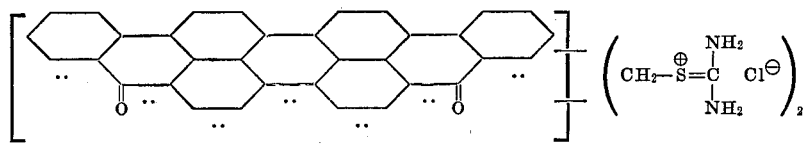

are dissolved in 500 parts of water and mixed with 500 parts of a 5% solution of triglycidyl isocyanurate. A cotton fabric is impregnated with this preparation, squeezed to a weight increase of 70%, dried in an infra red heater and hardened for 60 seconds at 200° C. on a tenter. A fast, bluish grey dyeing is obtained.

Similar, good results are obtained with the dyestuffs of the following formulae (11)

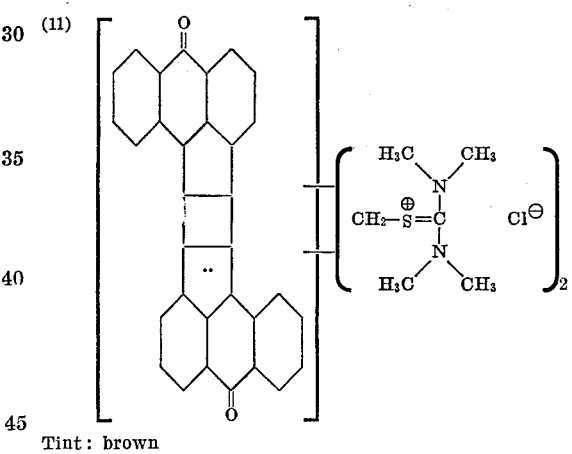

Tint: brown (12)

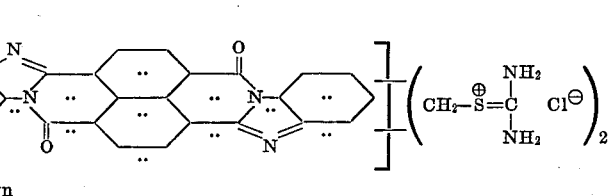

Tint: brown (13)

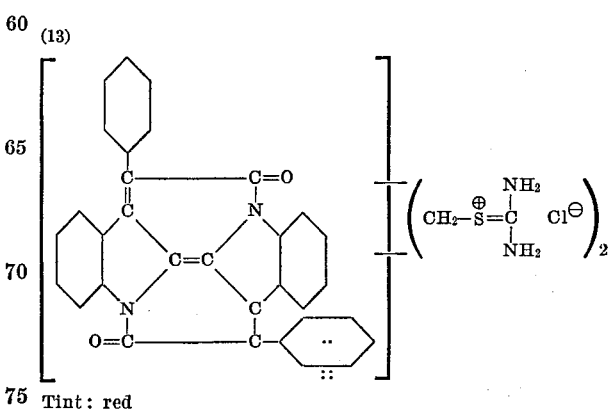

Tint: red (14)

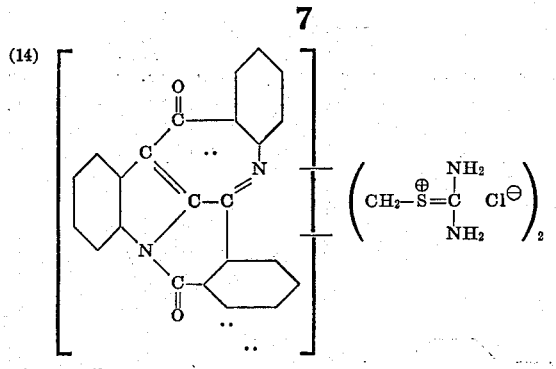

Tint: yellow (15)

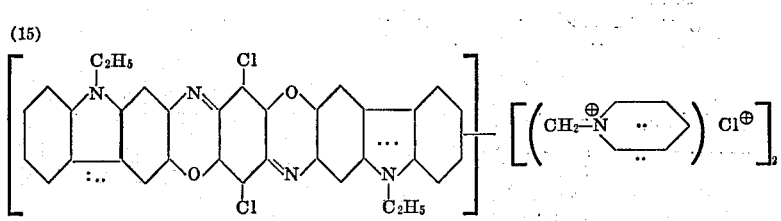

Tint: blue

When the triglycidyl isocyanurate is replaced by an equivalent amount of diglycidyl dimethylhydantoin and the thiourea by ethylene thiourea and the procedure is otherwise as described above, similar good results are obtained.

Diglycidyl dimethylhydantoin may be prepared in the following manner:

A mixture of 128 g. of 5,5-dimethylhydantoin, 2775 g. of epichlorohydrin and 1 g. of triethylamine is heated to the boil at 117° C. The epichlorohydrin undergoes an additive reaction with the two —NH— groups to form first epichlorohydrin groups and then epoxide groups. The formation of epoxide groups during the reaction is observed by titration after removal of the epichlorohydrin. After 3 hours the resin contains 4.76 epoxide equivalents per kg. The mixture is cooled at 60° C., whereupon 240 g. of 97% sodium hydroxide are added portionwise within 35 minutes, while maintaining the temperature at 60° C. by slight cooling. After the addition of the sodium hydroxide the mixture is stirred for 30 minutes at 60° C. The reaction product is concentrated under a vacuum of 35 mm. Hg until all the water formed is removed by azeotropic distillation. The salt formed is filtered and rinsed with a small amount of epichlorohydrin. The product is then further concentrated, first under a vacuum of 20 mm. Hg to recover the excess epichlorohydrin, and then under a vacuum of 0.2 mm. Hg to remove the last traces of volatile constituents. The yield is 237 g. of a clear, yellow resin of low viscosity which contains 7.7 epoxide equivalents per kg. The product, N,N-diglycidyl-5,5-dimethylhydantoin, is completely soluble in water.

What is claimed is:

1. A process for coloring fibrous materials, wherein a water-soluble dyestuff containing an onium group is fixed on said material with an epoxy compound of the formula

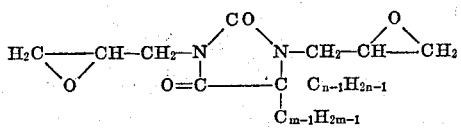

in which $m$ and $n$ each is 1 or 2; by heat treatment.

2. A process as claimed in claim 1, wherein the dyestuff used contains an isothiuronium group.

3. A process as claimed in claim 1 wherein the dyestuff is fixed by a thermosetting process.

4. A process as claimed in claim 1 wherein the dyestuff is fixed by wet storage followed by drying.

5. A process as claimed in claim 1, wherein the dyestuff is fixed by heating or drying at 100° to 300° C.

6. A process as claimed in claim 1, wherein the dyestuff is fixed by a dry heat treatment at a temperature within the range from 160° to 240° C.

7. A process as claimed in claim 1 wherein a weakly acid or neutral dyestuff solution is used.

8. A process as claimed in claim 1, wherein a member selected from the class consisting of hydrophobic, polyhydroxylated textile material and a mixture of such materials is impregnated with a dyestuff solution incorporating a water-soluble dyestuff containing a thiouronium group, the impregnated material is dried, padded with an aqueous solution incorporating said epoxy compound and the fabric is once more dried.

9. A process as claimed in claim 1, wherein a dyestuff solution is used that contains phthalocyanine dyestuff.

10. A process as claimed in claim 1, wherein a dyestuff solution is used that contains thiourea.

11. A process as claimed in claim 1 wherein a material made of or containing cellulose is dyed.

12. A process as claimed in claim 7, wherein the dyestuff is fixed by drying at 160 to 240° C.

13. A process as claimed in claim 1 wherein a dyestuff is used that contains an onium group as the only group imparting solubility in water.

14. A fibrous textile material dyed by means of a water-soluble dyestuff which contains an onium group as water-solubilizing substituent and is fixed on the textile material by means of an epoxy compound as defined in claim 1.

References Cited

UNITED STATES PATENTS

| | | | |
|---|---|---|---|
| 3,044,843 | 7/1962 | Tullio | 8—17 |
| 3,046,075 | 7/1962 | Kantner et al. | 8—17 |
| 3,108,846 | 10/1963 | Utsonomiya et al. | 8—17 XR |
| 3,113,127 | 12/1963 | Anderson et al. | 8—1.3 XR |
| 3,138,430 | 6/1964 | Rafael et al. | 8—62 |
| 3,255,173 | 6/1966 | Dehnert et al. | 8—1.24 |

FOREIGN PATENTS

| | | |
|---|---|---|
| 1,359,935 | 3/1964 | France. |
| 971,358 | 9/1964 | Great Britain. |

OTHER REFERENCES

Diserens, Chemical Technology of Dyeing and Printing, vol. I, 1951, pages 8 and 51 and vol. II, pages 4 and 9, pub. 1951 by Rheinhold Pub. Corp., N.Y.

Lutzel, J. Soc. Dyers and Colourists, vol. 82, No. 8 August 1966.

DONALD LEVY, Primary Examiner

U.S. Cl. X.R.

8—7, 8, 55, 57, 3, 34, 54.2, 85, 93, 100, 41, 82, 21

CASE 5792/E

PO-1050
(5/69)

UNITED STATES PATENT OFFICE
CERTIFICATE OF CORRECTION

Patent No. 3,494,717     Dated February 10, 1970

Inventor(s) JACQUES WEGMANN ET AL

It is certified that error appears in the above-identified patent and that said Letters Patent are hereby corrected as shown below:

Column 7, line 65, delete formula and insert ---

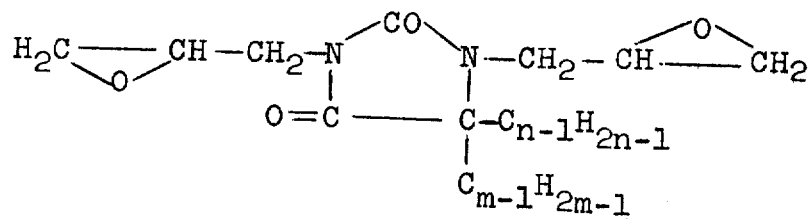

---.

MAR. 9, 1971

(SEAL)
Attest:

Edward M. Fletcher, Jr.
Attesting Officer

WILLIAM E. SCHUYLER, JR.
Commissioner of Patents